(12) United States Patent
Tsuchiya et al.

(10) Patent No.: US 6,972,545 B2
(45) Date of Patent: Dec. 6, 2005

(54) BATTERY PACK AND BATTERY REMAINING POWER CALCULATING METHOD

(75) Inventors: Yukio Tsuchiya, Kanagawa (JP); Hideyuki Sato, Chiba (JP); Kei Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 10/486,448

(22) PCT Filed: Jun. 11, 2003

(86) PCT No.: PCT/JP03/07436

§ 371 (c)(1),
(2), (4) Date: Feb. 10, 2004

(87) PCT Pub. No.: WO03/107470

PCT Pub. Date: Dec. 24, 2003

(65) Prior Publication Data

US 2004/0212349 A1    Oct. 28, 2004

(30) Foreign Application Priority Data

Jun. 12, 2002 (JP) .............................. 2002-171828

(51) Int. Cl.[7] ...................... H01M 10/44; H01M 10/46
(52) U.S. Cl. ...................................... 320/132; 324/426
(58) Field of Search .......................... 320/132, 149, 320/DIG. 21; 324/426, 427, 430, 433

(56) References Cited

U.S. PATENT DOCUMENTS

| | | | | |
|---|---|---|---|---|
| 4,394,741 A | * | 7/1983 | Lowndes | ............. 320/DIG. 21 |
| 5,847,566 A | * | 12/1998 | Marritt et al. | ............... 324/427 |
| 5,883,497 A | * | 3/1999 | Turnbull | ..................... 320/132 |
| 5,949,217 A | | 9/1999 | Okada et al. | |
| 6,501,249 B1 | * | 12/2002 | Drori | .......................... 320/149 |
| 2001/0022518 A1 | | 9/2001 | Asakura et al. | |

FOREIGN PATENT DOCUMENTS

| | | |
|---|---|---|
| JP | 10-213638 | 8/1998 |
| JP | 2001-231179 | 8/2001 |
| JP | 2001-286064 | 10/2001 |

* cited by examiner

*Primary Examiner*—Edward H. Tso
(74) *Attorney, Agent, or Firm*—Frommer Lawrence & Haug LLP; William S. Frommer

(57) ABSTRACT

The present invention relates to a battery pack having a function for calculating a remaining capacity of a battery cell that can be charged. When a calculated capacity integrated value Y is smaller than a maximum capacity integrated value Ym, a microcomputer (5) incorporated in the battery pack determines the capacity integrated value Y as the remaining capacity data of a battery. When the calculated capacity integrated value Y is the maximum capacity integrated value Ym or larger, the microcomputer determines the maximum capacity integrated value Ym as the remaining capacity data of the battery. Further, the microcomputer (5) corrects a reference capacity integrated value Y0 on the basis of the number of times that the capacity integrated value Y reaches the maximum capacity integrated value Ym.

20 Claims, 11 Drawing Sheets

BATTERY PACK AND BATTERY REMAINING POWER CALCULATING METHOD

TECHNICAL FIELD

The present invention relates to a battery pack used as a power source of an electronic device such as a video camera, a portable telephone or a personal computer and a method for calculating the remaining capacity of a battery in the battery pack.

This application claims a priority based on Japanese Patent Application No. 2002-171828 filed in Jun. 12, 2002 in Japan and Japanese Patent Application No. 2002-242650 filed in Aug. 22, 2002 in Japan. These applications are applied to this application by referring to them.

BACKGROUND ART

A battery pack having a battery cell as a secondary battery capable of charging such as a lithium-ion battery, an NiCd battery, a nickel hydrogen battery, etc. has been hitherto employed. Such a kind of battery pack is used as a power source of an electronic device such as a video camera, a portable telephone, or a personal computer or the like.

In the battery pack used as the power source of the electronic device, for instance, a microcomputer that calculates the remaining capacity of the battery and communicates with the electronic device using the battery pack as the power source, a peripheral circuit of the microcomputer, a state detecting circuit of the battery cell necessary for calculating the remaining capacity of the battery by the microcomputer, and a nonvolatile memory in which data necessary for calculating the remaining capacity of the battery is stored are incorporated.

The electronic device using the battery pack displays the remaining capacity of the battery calculated by the microcomputer, for instance, in terms of time.

The remaining capacity of the above-described battery pack can be represented by a capacity integrated value Y obtained by integrating electric current flowing upon charging and discharging.

As disclosed in, for instance, Japanese Patent Application Laid-Open No. hei 9-285026, the capacity integrated value Y is obtained in such a way that the capacity integrated value is reset to a reference value (refer it to as a reference capacity integrated value, hereinafter) Y0 every time the battery pack is charged and discharged and a current value is integrated by regarding the reference capacity integrated value Y0 as a reference.

As the reference capacity integrated value Y0, a capacity integrated value when the battery pack is charged to 90% as much as a full-charge, for instance, upon shipment is employed. In such a kind of battery pack, as a method for resetting the capacity integrated value Y to the reference capacity integrated value Y0, a method as described below is exemplified. That is, a current value Ix when the battery pack is subjected to a constant voltage charging operation before shipping to obtain the capacity integrated value Y=the reference capacity integrated value Y0 is stored in a nonvolatile memory together with the reference capacity integrated value Y0, and then, when the battery pack undergoes the constant voltage charging operation upon its use to obtain the current value of Ix, the capacity integrated value Y is reset to the reference capacity integrated value Y0.

It has been known that the above-described battery pack has its capacity reduced with the lapse of time, that is, the battery pack is deteriorated. When the battery pack is deteriorated, the difference between the remaining capacity of the battery calculated by the microcomputer and an actual remaining capacity of the battery in the battery pack is generated.

Accordingly, when the battery pack is deteriorated, the capacity integrated value Y calculated by the microcomputer needs to be corrected.

As a method for correcting the capacity integrated value Y, a method is considered that, for instance, a prescribed coefficient is multiplied by the capacity integrated value Y to correct the capacity integrated value on the basis of causes that deteriorate the battery pack.

As the causes that deteriorate the battery pack, number of times of charging and discharging the battery pack, the use of the battery pack and storage conditions, etc. may be exemplified.

In the battery pack, it has been known that as the number of times of charging and discharging the battery pack is more increased, the deterioration of the battery pack is more advanced. For example, in the lithium-ion battery, it has been known that charging and discharging operations are performed 500 times to have a capacity as much as 60%.

The number of times of charging and discharging the battery pack can be obtained by a method disclosed in, for instance, Japanese Patent Application Laid-Open No. hei 9-243718 or the like. Accordingly, the capacity integrated value Y can be corrected on the basis of the number of times of charging and discharging the battery pack.

As is known, a way of deterioration of the battery pack is changed depending on using conditions or the storage conditions. Further, as is known, for instance, when the battery pack is continuously used for a long time or when the battery pack is used at low temperature or the like, the battery pack is liable to be deteriorated. Japanese patent Application Laid-Open No. 2000-260488 discloses a method for calculating the remaining capacity of a battery in accordance with temperature change.

However, all of the using conditions or the storage conditions of the battery pack is hardly grasped. Accordingly, it is difficult to correct the capacity integrated value Y in accordance with the using conditions or the storage conditions of the battery pack.

As another method for correcting the capacity integrated value Y, a method is considered that the degree of deterioration of a deteriorated battery pack is actually measured and the capacity integrated value is corrected on the basis of the recognized degree of deterioration.

The degree of deterioration of the battery pack is measured by what is called a five-hour method. The five-hour method is a method that after the battery pack is charged to a fully charged state from an empty state, the battery pack is discharged for about 5 hours to measure the degree of deterioration of the battery pack.

A charging time is different depending on capacities of batteries. For instance, in a battery pack "NP-FC10" (trade name) used in a digital camera produced by Sony Corporation, it takes about 3 hours to charge the battery pack.

As described above, when the degree of deterioration of the battery pack is actually measured, it takes about 8 hours. That is, when the degree of deterioration of the battery pack is actually measured and the capacity is corrected on the basis of the recognized degree of deterioration, a long time is needed to correct the capacity. To actually measure the degree of deterioration of the battery pack by the method as described above, the charging and discharging operation of the battery pack needs to be performed once. Therefore, the degree of deterioration of the battery pack is actually measured so that the deterioration of the battery pack is further accelerated.

DISCLOSURE OF THE INVENTION

It is an object of the present invention to provide a new battery pack and a method for calculating the remaining capacity of a battery that can solve the above-described problems of a usual battery pack.

It is another object of the present invention to provide a battery pack and a method for calculating the remaining capacity of a battery in which the decrease of capacity based on not only the number of times of charging and discharging operations, but also using conditions and storage conditions or the like can be simply corrected and the remaining capacity of the battery as a value extremely near to an actual remaining capacity can be detected.

As the deterioration of a battery pack using a battery cell that can be charged is progresses, internal impedance is increased. Accordingly, when a new battery pack undergoes a constant voltage charging operation, since the internal impedance is low, much electric current is allowed to flow upon start of charging operation, a quantity of electric current flowing during the charging operation is rapidly decreased and the battery pack is completely charged for a short charging time ($h_1$). On the other hand, when a deteriorated battery pack undergoes a constant voltage charging operation, since the internal impedance is high, a small quantity of electric current flows upon start of charging operation and the quantity of electric current flowing during the charging operation is slowly decreased to require a long charging time ($h_2$).

The inventors of the present invention eagerly continuously studied to achieve the above-described objects. Then, they recognized that since a charging current changed upon charging operation as shown in B in FIG. 1 in the deteriorated battery pack, and the charging current changed upon charging operation as shown in A in FIG. 1 in the new battery pack, an integrated quantity of electric current flowing after the charging current reached a reference current value Ix was more in the deteriorated battery pack than that in the new battery pack.

A battery pack mounted on an external device according to the present invention comprises: a battery cell that is charged and discharged; a current detecting means for detecting electric current flowing when the battery cell is charged and discharged; a capacity integrated value calculating means for calculating a capacity integrated value by integrating the electric current; a reset means for resetting the capacity integrated value to a reference capacity integrated value when the current detected by the current detecting means reaches a prescribed value; a storing means for storing a maximum capacity integrated value and the reference capacity integrated value; and a data calculating means for calculating a remaining capacity data of a battery on the basis of the capacity integrated value. The capacity integrated value calculating means integrates the current by regarding the reference capacity integrated value as a reference. The data calculating means determines the capacity integrated value calculated by the capacity integrated value calculating means as the remaining capacity data of the battery when the capacity integrated value calculated by the capacity integrated value calculating means is smaller than the maximum capacity integrated value and determines the maximum capacity integrated value as the remaining capacity data of the battery when the capacity integrated value calculated by the capacity integrated value calculating means is not smaller than the maximum capacity integrated value.

Another battery pack mounted on an external device according to the present invention comprises: a battery cell that is charged and discharged; a current detecting means for detecting electric current flowing when the battery cell is charged and discharged; a capacity integrated value calculating means for calculating a capacity integrated value by integrating the electric current; a reset means for resetting the capacity integrated value to a reference capacity integrated value when the current detected by the current detecting means reaches a prescribed value; a storing means for storing a maximum capacity integrated value and the reference capacity integrated value; reaching time counting means for counting a number of times that the capacity integrated value calculated by the capacity integrated value calculating means reaches the maximum capacity integrated value; and a reference capacity integrated value correcting means for correcting the reference capacity integrated value on the basis of the number of times counted by a reaching time counting means. The capacity integrated value calculating means integrates the current on the basis of the reference capacity integrated value to calculate the capacity integrated value and determines the capacity integrated value as the remaining capacity data of a battery.

A method for calculating a remaining capacity of a battery of a battery pack mounted on an external device according to the present invention comprises: a current detecting step of detecting electric current flowing when the battery cell provided in the battery pack is charged and discharged; a capacity integrated value calculating step of calculating a capacity integrated value by integrating the electric current; a resetting step of resetting the capacity integrated value to a reference capacity integrated value when the current reaches a prescribed value; and a data calculating step of calculating the remaining capacity data of a battery on the basis of the capacity integrated value. In the capacity integrated value calculating step, the current is integrated on the basis of the reference capacity integrated value. In the data calculating step, the capacity integrated value calculated in the capacity integrated value calculating step is compared with a maximum capacity integrated value stored in a storing means, and the capacity integrated value calculated in the capacity integrated value calculating step is determined as the remaining capacity data of the battery when the capacity integrated value calculated in the capacity integrated value calculating step is smaller than the maximum capacity integrated value and the maximum capacity integrated value is determined as the remaining capacity data of the battery when the capacity integrated value calculated in the capacity integrated value calculating step is larger than the maximum capacity integrated value.

Another method for calculating a remaining capacity of a battery of a battery pack mounted on an external device according to the present invention comprises: a current detecting step of detecting electric current flowing when the battery cell provided in the battery pack is charged and discharged; a capacity integrated value calculating step of calculating a capacity integrated value by integrating the electric current; a resetting step of resetting the capacity integrated value to obtain a reference capacity integrated value when the current reaches a prescribed value; a reaching time counting step of counting the number of times that the capacity integrated value calculated in the capacity integrated value calculating step reaches a maximum capacity integrated value stored in a storing means; and a first reference capacity integrated value correcting step of correcting the reference capacity integrated value stored in the storing means on the basis of the number of times counted in the reaching time counting step. In the capacity integrated value calculating step, the current is integrated on the basis of the reference capacity integrated value to calculate the capacity integrated value and the capacity integrated value is determined as the remaining capacity data of the battery.

Still another objects of the present invention and specific advantages obtained by the present invention will become more apparent from the explanation of embodiments described below by referring to the drawings.

BEST MODE FOR CARRYING OUT THE INVENTION

Now, a battery pack and a method for calculating a remaining capacity of a battery according to the present invention will be described in detail.

Figure 2:
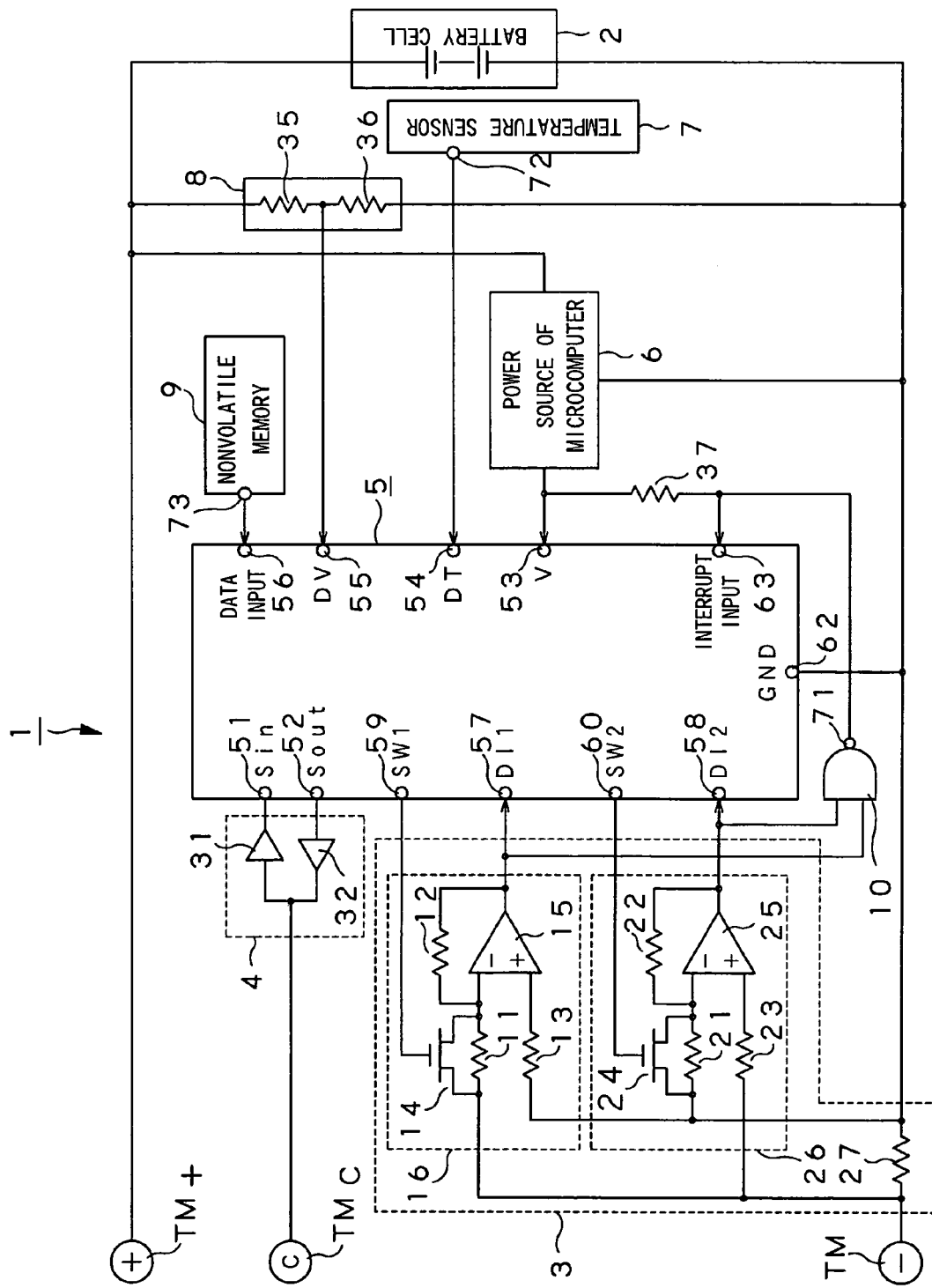
FIG. 2 is a block diagram showing a specific structure of a battery pack according to the present invention.

A battery pack 1 according to the present invention comprises, as shown in FIG. 2, a battery cell 2 that is charged and discharged, a charging and discharging current detecting circuit 3 for detecting electric current for charging and discharging the battery cell 2, a communication circuit 4, a microcomputer 5, a power source 6 of a microcomputer, a temperature sensor 7, a voltage detecting circuit 8, a nonvolatile memory 9 and a two input NAND gate 10.

The battery pack 1 is connected to or incorporated in an electronic device such as a video camera, a portable telephone or a personal computer and used as a power source of the electronic device.

In the battery pack 1 according to the present invention, a cathode of the battery cell 2 is connected to a plus terminal TM+ of the battery pack 1 and an anode of the battery cell 2 is connected to a minus terminal TM− of the battery pack 1 through a below-described seventh resistance.

The charging and discharging current detecting circuit 3 detects electric current flowing when the battery pack 1 is charged and discharged to supply the electric current to the microcomputer 5. The charging and discharging current detecting circuit 3 includes a charging current detecting part 16 having a first resistance 11, a second resistance 12, a third resistance 13, a first switching transistor 14 and an operational amplifier 15 for charging current, a discharging current detecting part 26 having a fourth resistance 21, a fifth resistance 22, a sixth resistance 23, a second switching transistor 24 and an operational amplifier 25 for discharging current and a seventh resistance 27. The detailed operation of the charging and discharging current detecting circuit 3 will be described below.

The communication circuit 4 includes a buffer amplifier 31 for inputting data and a buffer amplifier 32 for outputting data. The buffer amplifier 31 for inputting the data is connected to a data input terminal 51 provided in the microcomputer 5. The buffer amplifier 32 for outputting the data is connected to a data output terminal 52 provided in the microcomputer 5. The communication circuit 4 outputs data Sout outputted from the data output terminal 52 through the buffer amplifier 32 for outputting the data. The data outputted from the communication circuit 4 is supplied to an external device (not shown) such as the electronic device. Further, the communication circuit 4 supplies data Sin supplied from the external device is supplied to the data input terminal 51 through the buffer amplifier 31 for inputting the data.

The microcomputer 5 generates data showing the state of the battery pack 1. The microcomputer 5 integrates the electric current detected by the charging and discharging current detecting circuit 3 to calculate a capacity integrated value Y showing the remaining capacity of the battery pack 1. The microcomputer 5 counts the number of times that the battery pack 1 is charged and discharged. Further, the microcomputer 5 performs a communication between the external device and the microcomputer, for instance, the output of the remaining capacity data of a battery to the external device. The detail of the microcomputer 5 will be described later.

The microcomputer power source 6 serves as a power source of the microcomputer 5. The microcomputer power source 6 includes a series regulator or a reset circuit or the like. The microcomputer power source 6 is connected to a power terminal 53 provided in the microcomputer 5 to supply power V to the microcomputer 5 through the power terminal 53.

The temperature sensor 7 is composed of, for instance, a temperature detecting thermistor. The temperature sensor 7 is disposed at a position near the battery cell 2 or coming into contact with the battery cell 2. A temperature detected value DT of the temperature sensor 7 is supplied to a temperature detecting input terminal 54 of the microcomputer 5. Accordingly, the microcomputer 5 can recognize the temperature of the battery cell 2 on the basis of the temperature detected value DT supplied to the temperature detecting input terminal 54.

The voltage detecting circuit 8 detects voltage between terminals of the battery cell 2 by a voltage dividing resistance composed of an eighth resistance 35 and a ninth resistance 36. A voltage detected value DV from the voltage detecting circuit 8 is supplied to a voltage detecting input terminal 55 of the microcomputer 5. Accordingly, the microcomputer 5 can recognize voltage between terminals of the battery cell 2 on the basis of the voltage detected value DV supplied to the voltage detecting input terminal 55.

Figure 3:
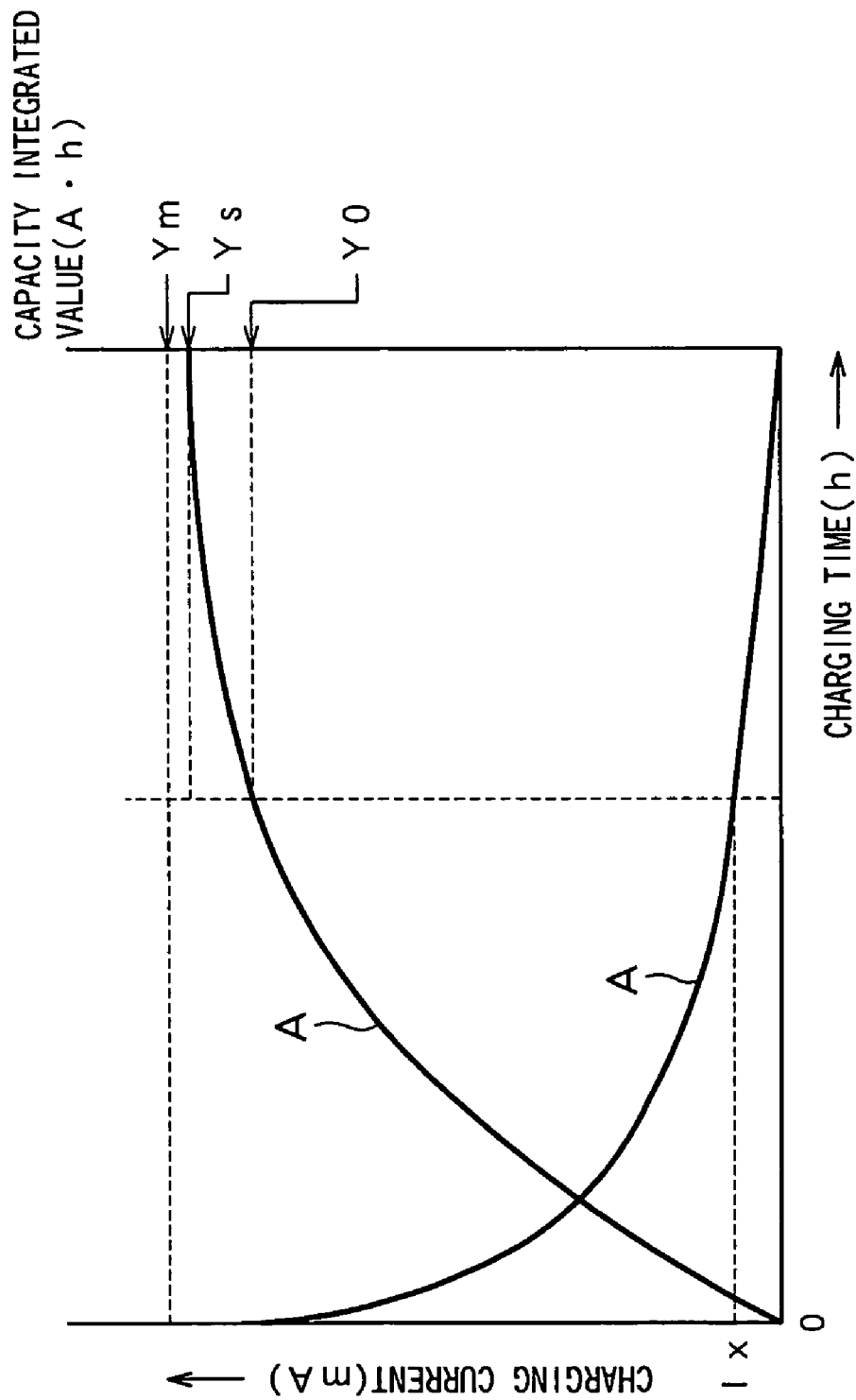
FIG. 3 is a diagram showing the change of a capacity integrated value, a maximum capacity integrated value and a reference capacity integrated value when a new battery pack is charged.

The nonvolatile memory 9 stores a maximum capacity integrated value Ym, a reference capacity integrated value Y0 and a reference current value Ix. The nonvolatile memory 9 is connected to a cycle data input terminal 56 provided in the microcomputer 5. The maximum capacity integrated value Ym, the reference capacity integrated value Y0 and the reference current value Ix stored in the nonvolatile memory 9 are inputted to the cycle data input terminal 56. As the maximum capacity integrated value Ym, a value slightly larger than the capacity of the battery pack 1 as a new product is employed as shown in FIG. 3. In the present invention, as a capacity integrated value Ys obtained when the battery pack 1 as a new product that has not been yet charged upon shipment is charged by using the reference capacity integrated value Y0, a capacity integrated value of 90% as high as a full charge is used. Further, in the battery pack 1 according to the present invention, as the reference current value Ix, a current value I is used when the battery pack 1 of a new product that has not been yet charged upon shipment is charged to obtain a capacity integrated value Y equal to the reference capacity integrated value Y0.

In the two input NAND gate 10, one of two input terminals is connected to the output terminal of the operational amplifier 15 for charging current. The other of the two input terminals is connected to the output terminal of the operational amplifier 25 for discharging current. The two input NAND gate 10 has an output terminal connected to the power terminal 53 through a tenth resistance 37. The two input NAND gate switches the operation mode of the microcomputer 5.

Now, the charging and discharging current detecting circuit 3 will be described in detail.

A noninverting input terminal of the operational amplifier 15 for charging current is connected to the anode of the battery cell 2 through the third resistance 13 and the seventh resistance 27. An inverting input terminal is connected to the second resistance 12 as a negative feedback resistance for setting an amplification factor and the first resistance 11. Further, the operational amplifier 15 for charging current is connected to a charging current detecting input terminal 57. Accordingly, from the output terminal of the operational amplifier 15 for charging current, a voltage value is outputted that is obtained by amplifying a value of electric current flowing in the battery pack 1 upon charging operation in accordance with a ratio of a resistance value of the first resistance 11 to a resistance value of the second resistance 12. The outputted voltage value is supplied to the charging current detecting input terminal 57.

The noninverting input terminal of the operational amplifier 25 for discharging current is connected to the anode of the battery cell 2 through the sixth resistance 23 and the seventh resistance 27. The inverting input terminal is connected to the fifth resistance 22 as a negative feedback resistance for setting an amplification factor and the fourth resistance 21. Further, the operational amplifier 25 for discharging current is connected to a discharging current detecting input terminal 58. Accordingly, from the output terminal of the operational amplifier 25 for discharging current, a voltage value is outputted that is obtained by amplifying a value of electric current flowing in the battery pack 1 upon discharging operation in accordance with a ratio of a resistance value of the fourth resistance 21 to a resistance value of the fifth resistance 22. The outputted voltage value is supplied to the discharging current detecting input terminal 58.

The first switching transistor 14 is composed of, for instance, a field effect transistor and has its gate connected to a switching control output terminal 59 of the microcomputer 5. Between the drain and the source of the first switching transistor 14, the first resistance 11 is connected. Accordingly, when a signal level from the switching control output terminal 59 of the microcomputer 5 becomes, for instance, a high (H) level, the first switching transistor 14 is turned ON. Thus, the resistance value by the first resistance 11 is composed only of the resistance of the first switching transistor 14 that is substantially zero and the amplification factor of the operational amplifier 15 for charging current is increased. On the other hand, when the signal level from the switching control output terminal 59 of the microcomputer 5 becomes, for instance, a low (L) level, the first switching transistor 14 is turned OFF and the amplification factor of the operational amplifier 15 for charging current is an amplification factor meeting a ratio of the resistance value of the first resistance 11 to the resistance value of the second resistance 12, that is, an amplification factor smaller than that when the first switching transistor 14 is turned ON.

The second switching transistor 24 is also composed of a field effect transistor and has its gate connected to a switching control output terminal 60 of the microcomputer 5. Between the drain and the source of the second switching transistor 24, the fourth resistance 21 is connected. Accordingly, when a signal level from the switching control output terminal 60 of the microcomputer 5 becomes, for instance, a high (H) level, the second switching transistor 24 is turned ON. Thus, the resistance value by the fourth resistance 21 is composed only of the resistance of the second switching transistor 24 that is substantially zero and the amplification factor of the operational amplifier 25 is increased. On the other hand, when a signal level from the switching control output terminal 60 of the microcomputer 5 becomes, for instance, a low (L) level, the second switching transistor 24 is turned OFF and the amplification factor of the operational amplifier 25 for discharging current is an amplification factor meeting the ratio of the resistance value of the fourth resistance 21 to the resistance value of the fifth resistance 22, that is, an amplification factor smaller than that when the second switching transistor 24 is turned ON.

Here, during an ordinary operation mode (during running), the microcomputer 5 always monitors the levels of the charging current detecting input terminal 57 and the discharging current detecting input terminal 58. When the levels of the charging current detecting input terminal 57 and the discharging current detecting input terminal 58 are not lower than prescribed levels, the microcomputer 5 sets both the signal levels of the switching control output terminals 59 and 60 to low (L) levels. Thus, both the first switching transistor 14 and the second switching transistor 24 are turned OFF so that the amplification factors of the operational amplifier 15 for charging current and the operational amplifier 25 for discharging current are decreased. Accordingly, the microcomputer 5 in the ordinary operation mode (upon running), may use output values from the operational amplifier 15 for charging current and the operational amplifier 25 for discharging current in which the amplification factors are low to measure a current value flowing in the battery pack 1 upon charging or discharging. Consequently, the values of electric current flowing upon charging and discharging operations are measured so that charging and discharging current integrated values can be calculated.

On the other hand, upon ordinary operation mode (upon running), when the charging and discharging current flowing in the battery pack 1 becomes a small current whose current value is a prescribed value or smaller, outputs from the operational amplifier 15 for charging current and the operational amplifier 25 for discharging current in which the amplification factors are low are also decreased. That is, the levels of the charging current detecting input terminal 57 and the discharging current detecting input terminal 58 also become low. When the levels of the charging current detecting input terminal 57 and the discharging current detecting input terminal 58 are prescribed levels or lower and this state continues for a prescribed time, the microcomputer 5 decides that this state is a non-load state to shift to a power saving mode (sleep mode). Consumed power upon power saving mode is lower than that upon ordinary operation mode, so that the energy of a circuit can be saved.

The microcomputer 5 under the power saving mode sets the signal levels of the switching control output terminals 59 and 60 to high (H) level. Thus, the first switching transistor 14 and the second switching transistor 24 are turned ON and the amplification values of the operational amplifier 15 for charging current and the operational amplifier 25 for discharging current are increased. Accordingly, the microcomputer 5 under the power saving mode can measure the current value of the small current flowing through the battery pack 1 upon charging or discharging by using output values from the operational amplifier 15 for charging current and the operational amplifier 25 for discharging current in which the amplification factors are high.

Here, upon power saving mode, when the current value of the charging or discharging current becomes a prescribed value or higher, both output values from the operational amplifier 15 for charging current and the operational amplifier 25 for discharging current in which the amplification factors are low are also increased. That is, the levels of two input terminals of the two input NAND gate 10 become high levels, so that the output of the two input NAND gate 10 becomes a low level. As described above, when the level of the output of the two input NAND gate 10 supplied to an interrupt input terminal becomes the low level, the microcomputer 5 releases the power saving mode to shift to the ordinary operation mode.

As described above, since the battery pack 1 has the consumed power upon power saving mode lower than that upon ordinary operation mode, the energy of the circuit can be saved. Further, in the battery pack 1, the microcomputer 5 controls the first switching transistor 14 to be turned ON/OFF by a switching control output SW1 inputted to the switching control output terminal 59 and controls the second switching transistor 24 to be turned ON/OFF by a switching control output SW2 inputted to the switching control output terminal 60. Accordingly, in the battery pack 1, the amplification factors of the operational amplifier 15 for charging current and the operational amplifier 25 for discharging current can be changed. Thus, the small current can be detected upon power saving mode and the current value can be measured upon ordinary operation mode at the same time by the above-described structure.

Now, the microcomputer 5 will be described below in detail.

The charging current detecting input terminal 57 of the microcomputer 5 is connected to the output terminal of the operational amplifier 15 for charging current and the discharging current detecting input terminal 58 is connected to the output terminal of the operational amplifier 25 for discharging current. Further, the interrupt input terminal 63 of the microcomputer 5 is connected to the output terminal of the two input NAND gate 10 having two input terminals to which the output terminals of the operational amplifier 15 for charging current and the operational amplifier 25 for discharging current are respectively connected. Further, the output terminal of the two input NAND gate 10 is connected to the power terminal 53 through the tenth resistance 37. Further, the temperature detecting input terminal 54 of the microcomputer 5 is connected to the output terminal 72 of the temperature sensor 7. The cycle data input terminal 56 is connected to the output terminal 73 of the nonvolatile memory 9 and a ground terminal 62 is connected to the anode of the battery cell 2.

The microcomputer 5 calculates the capacity integrated value Y on the basis of the reference capacity integrated value Y0 stored in the nonvolatile memory 9 and calculates the remaining capacity data of a battery on the basis of the capacity integrated value Y. Further, the microcomputer 5 outputs the calculated remaining capacity of the battery to the external device. Further, the microcomputer 5 corrects the reference capacity integrated value Y0 on the basis of the number of times that the capacity integrated value Y reaches the maximum capacity integrated value Ym and the number of times that the battery pack 1 is charged and discharged.

Figure 4:
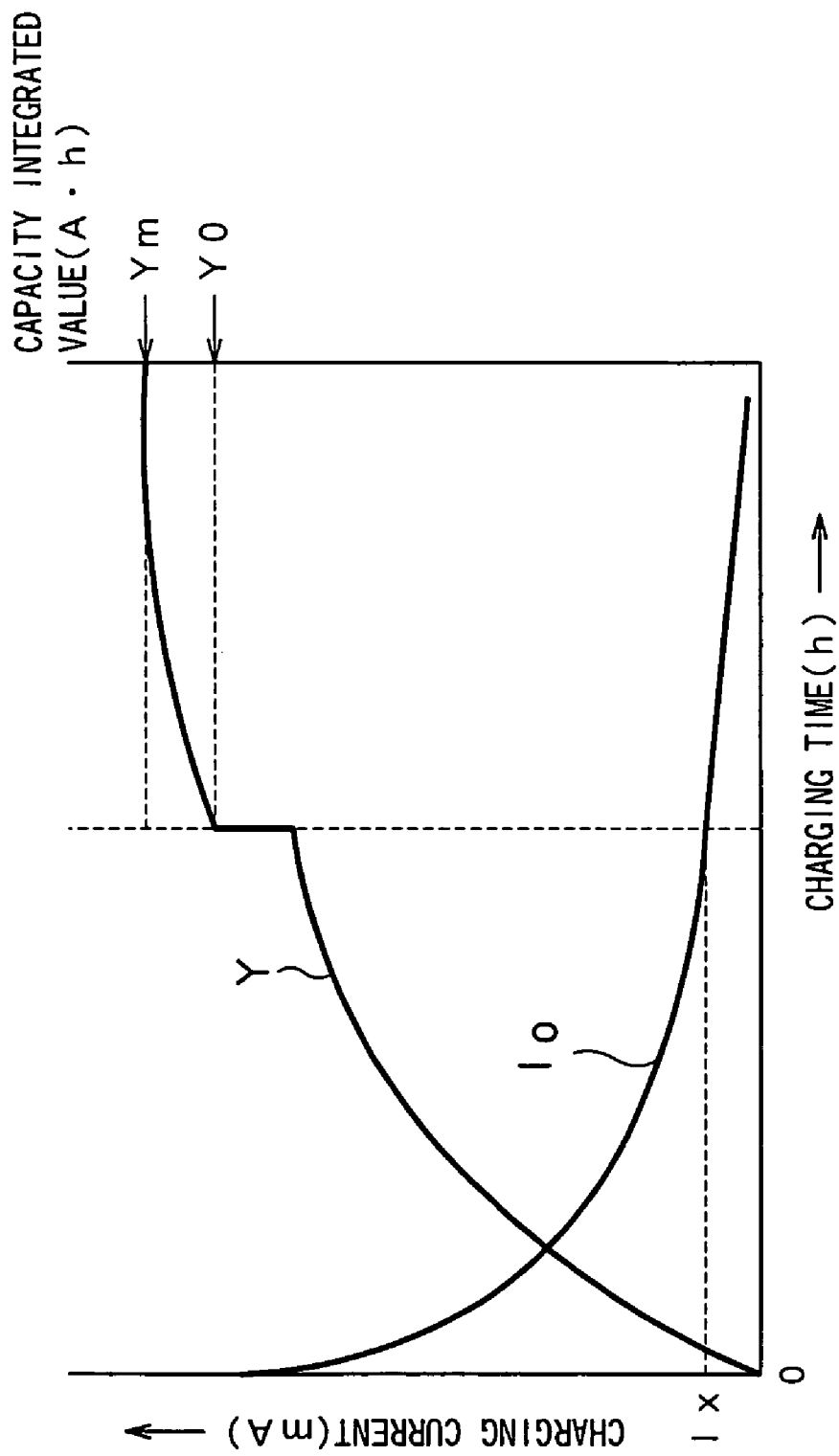
FIG. 4 is a diagram showing the change of the capacity integrated value when the battery pack is charged and a state that the capacity integrated value is rest to the reference capacity integrated value when the value of electric current passing a seventh resistance is Ix.

The microcomputer 5 calculates the current value to calculate the capacity integrated value Y. As shown in FIG. 4, the microcomputer 5 resets the capacity integrated value Y to the reference capacity integrated value Y0 every time the current value of charging current Io after a constant voltage charging operation becomes Ix to calculate the capacity integrated value Y. Further, the microcomputer 5 determines the capacity integrated value Y calculated when the capacity integrated value Y is smaller than the maximum capacity integrated value Ym, as the remaining capacity data of the battery. When the capacity integrated value Y is not smaller than the maximum capacity integrated value Ym, the microcomputer 5 determines the maximum capacity integrated value Ym as the remaining capacity data of the battery.

A principle that the capacity integrated value Y calculated in the microcomputer 5 becomes the maximum capacity integrated value Ym or larger is described below.

Figure 5:
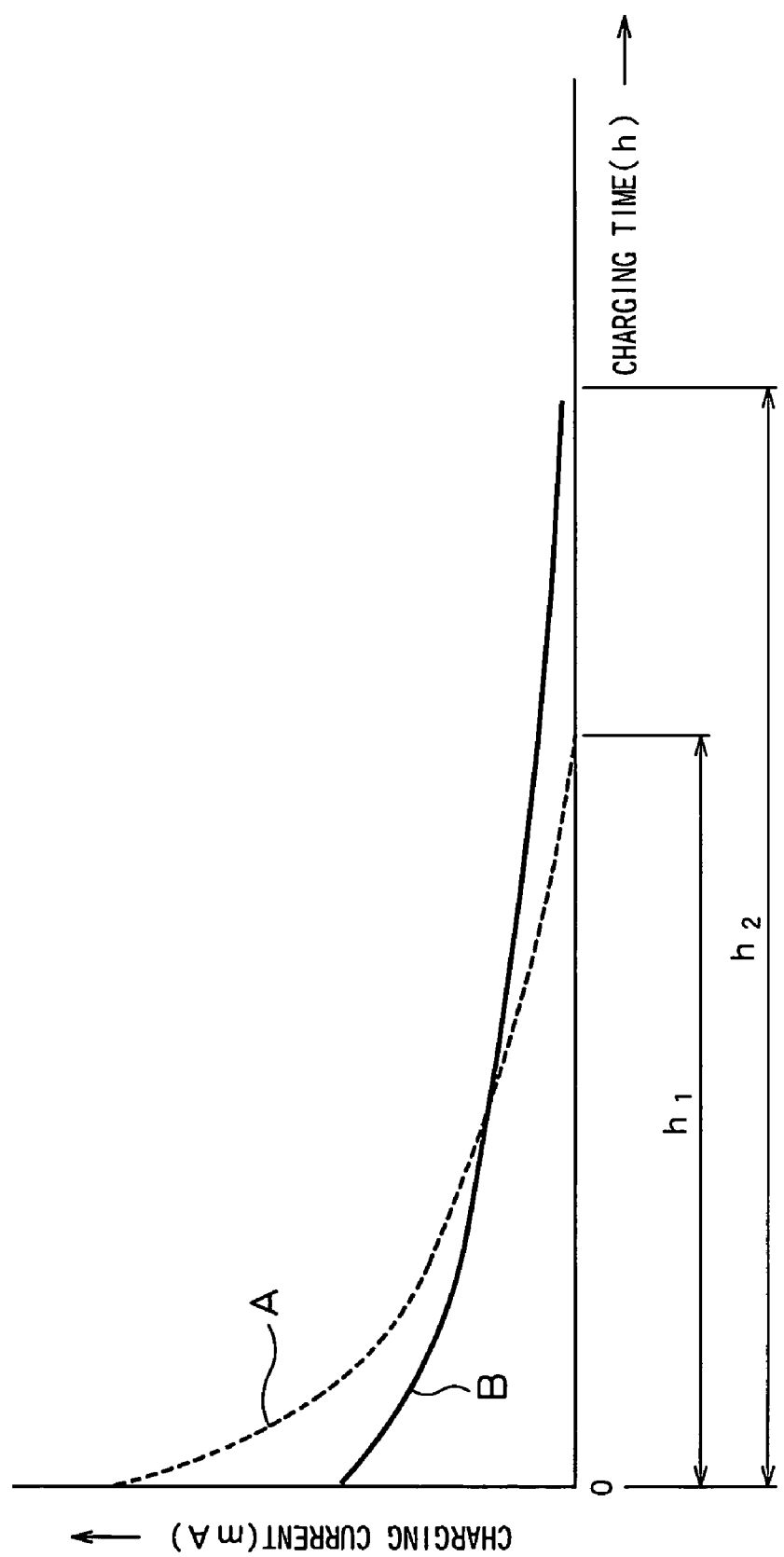
FIG. 5 is a diagram showing the change of a quantity of electric current passing the seventh resistance when the battery pack undergoes a constant voltage charging operation.

In the battery pack 1 according to the present invention, as the deterioration of the battery pack progresses, the internal impedance of the battery cell 2 is increased. That is, when the new battery pack 1 undergoes a constant voltage charging operation, the internal impedance of the battery cell 2 is low. Thus, a large quantity of electric current is supplied to the seventh resistance 27 upon start of the charging operation as shown in A of FIG. 5. The quantity of supplied electric current is rapidly decreased and the charging operation is completed for a prescribed time ($h_1$). On the other hand, when the deteriorated battery pack 1 undergoes the constant voltage charging operation, since the internal impedance of the battery cell 2 is high, a quantity of electric current supplied to the seventh resistance 27 upon start of the charging operation is small. The decrease of the quantity of supplied electric current is slow and it takes time ($h_2$) longer than the above prescribed time (h$_1$) until the charging operation is completed as shown in B of FIG. 5.

Therefore, when the deteriorated battery pack 1 is subjected to the constant voltage charging operation, the battery pack 1 is not yet charged to 90% as much as a full-charge when the current value reaches Ix. Further, when the deteriorated battery pack 1 undergoes the constant voltage charging operation, the quantity of electric current supplied to the seventh resistance 27 after the current value reaches Ix is larger than that of the new battery pack 1.

Figure 1:
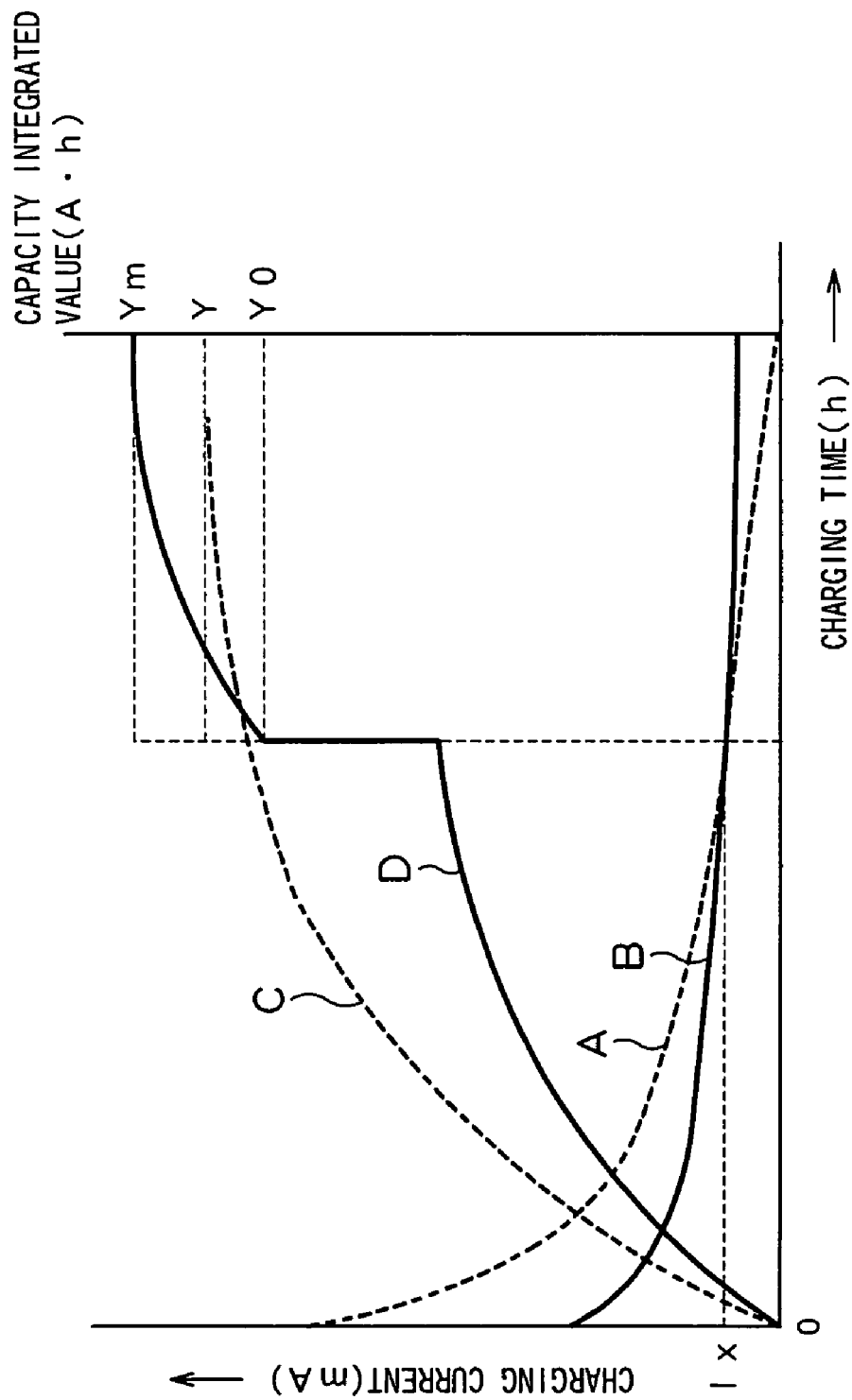
FIG. 1 is a diagram showing the change of a capacity integrated value when a battery pack is charged under a state that the deterioration of the battery pack progresses.

In accordance with the above-described reasons, when the microcomputer 5 resets the capacity integrated value Y to the reference capacity integrated value Y0 every time the current value reaches Ix after the constant voltage charging operation is performed to calculate the capacity integrated value Y, the capacity integrated value in the deteriorated pack 1 changes upon charging operation as shown in D of FIG. 1, and the capacity integrated value changes in the new battery pack 1 as shown in C of FIG. 1. That is, in the deteriorated battery pack 1, the capacity integrated value Y obtained when the battery pack is fully charge is larger than that of the new battery pack 1. The maximum capacity integrated value Ym is set to a value slightly larger than the capacity integrated value Y when the new battery pack 1 is fully charged. Accordingly, as the deterioration of the battery pack 1 progresses, the capacity integrated value Y upon full charge is higher than the maximum integrated value Ym to reach the maximum capacity integrated value Ym.

Figure 6:
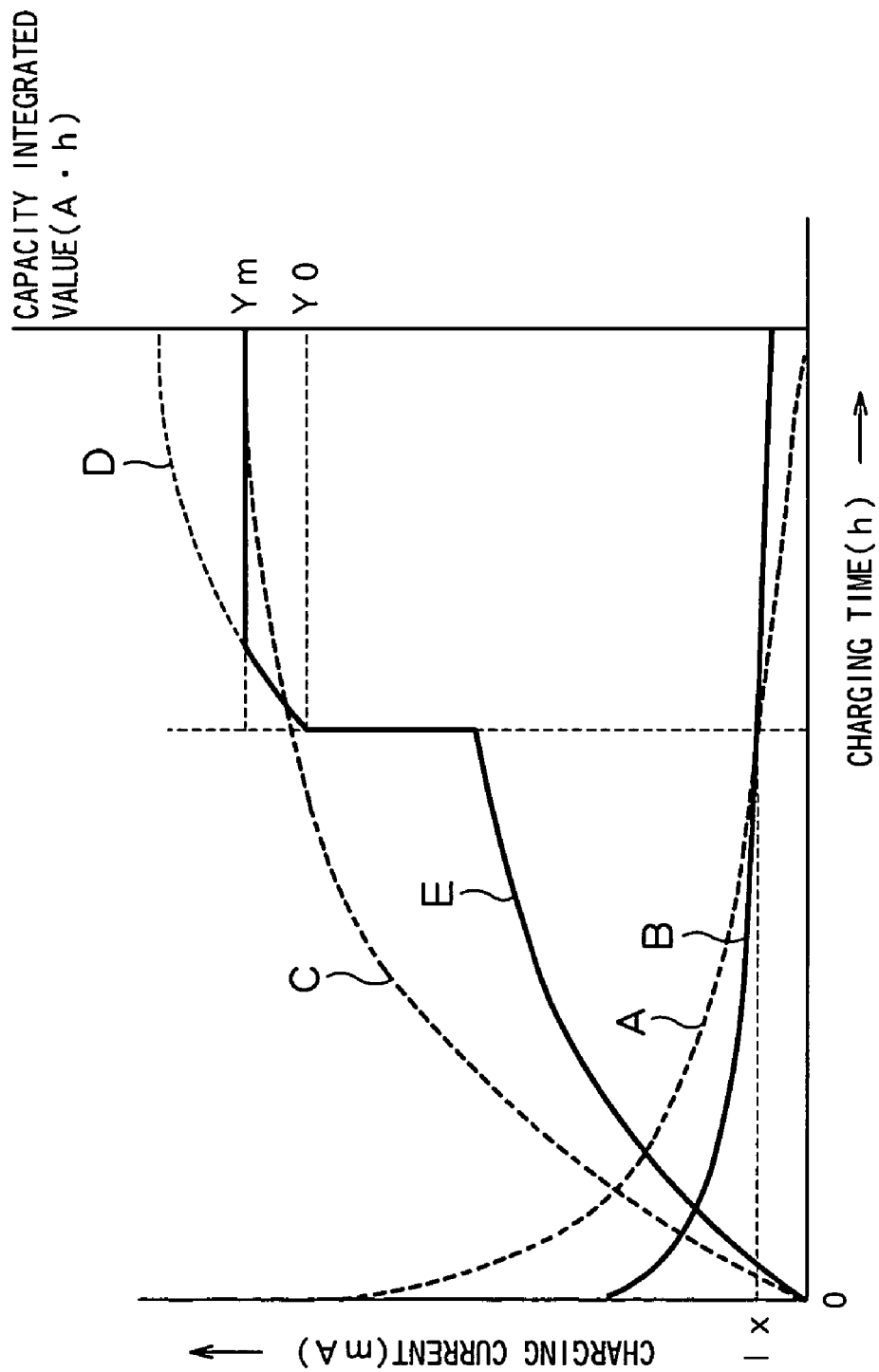
FIG. 6 is a diagram showing that a microcomputer outputs the maximum capacity integrated value as the remaining capacity data of a battery when the capacity integrated value is not smaller than the maximum capacity integrated value.

Accordingly, when the capacity integrated value Y is the maximum capacity integrated value Ym or higher, the microcomputer 5 outputs the maximum capacity integrated value Ym to the external device as the remaining capacity data of the battery. Thus, the remaining capacity data of the battery of the battery pack 1 is outputted as shown in E of FIG. 6 to prevent the maximum capacity integrated value from being extremely larger than the capacity of the new battery pack 1. Consequently, for instance, when the remaining capacity of the battery pack 1 is displayed in an electronic device, the displayed remaining capacity of the battery pack 1 can be prevented from being extremely higher than the capacity obtained when the new battery pack 1 is fully charged.

Further, the microcomputer 5 corrects the reference capacity integrated value Y0 on the basis of the number of times (refer it to as the number of time of reaches, hereinafter) that the capacity integrated value Y reaches the maximum capacity integrated value Ym.

As described above, since the internal impedance of the battery cell 2 is high in the deteriorated battery pack 1, the quantity of electric current supplied to the seventh resistance 27 upon start of the charging operation is decreased to make the decrease of the quantity of supplied electric current slow. Accordingly, when the current value reaches Ix, the battery pack is not yet charged to 90% as much as a full charge. That is, in the battery pack 1, as the deterioration of the battery pack 1 progresses, an actual capacity integrated value obtained when the current value reaches Ix is smaller than the reference capacity integrated value Y0.

Further, when the deterioration of the battery pack 1 progresses, the capacity integrated value Y upon full charge is larger than the maximum capacity integrated value Ym so that the number of times that the capacity integrated value Y reaches the maximum capacity integrated value Ym is increased. That is, the number of times of reaches indicates the degree of deterioration of the battery pack 1.

Figure 7:
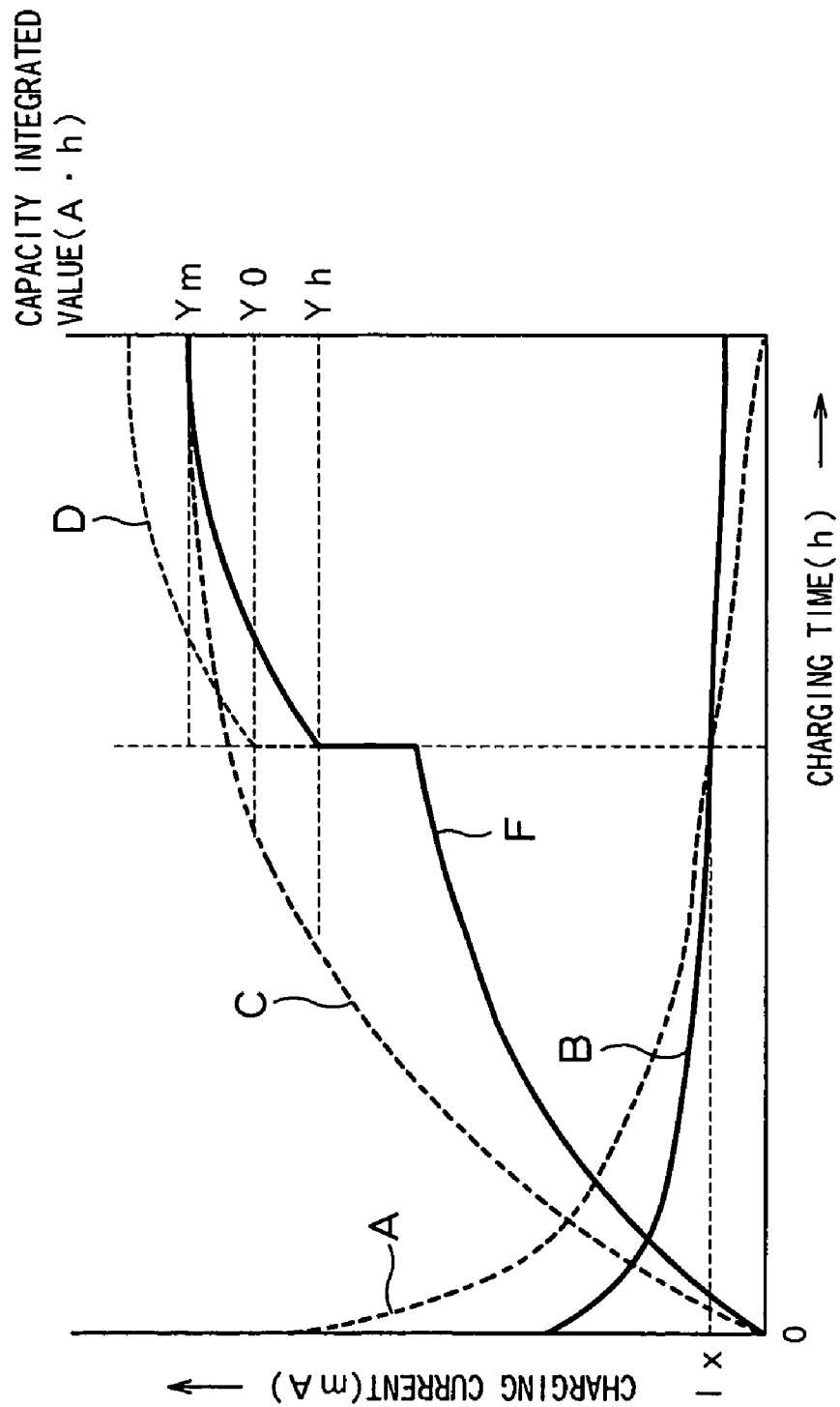
FIG. 7 is a diagram showing the change of the remaining capacity data of the battery when the reference capacity integrated value is corrected on the basis of a number of times of reaches.

Therefore, the reference capacity integrated value Y0 is corrected on the basis of the number of times of reaches in such a way that every time the number of times of reaches in the battery pack 1 increases, for instance, 10 times, the value of the reference capacity integrated value Y0 is corrected to have 95% as high as a value before the correction. Thus, in the battery pack 1, the remaining capacity data of the battery can be corrected on the basis of the actual capacity of the battery pack 1. Accordingly, in the battery pack 1, the remaining capacity data of the battery can be corrected on the basis of the deterioration due to the storage conditions or using conditions as well as the number of times of charging and discharging operations. In the battery pack 1, as shown in F of FIG. 7, the remaining capacity of the battery can be corrected so as to be near to the actual remaining capacity of the battery of the battery pack 1.

Further, in the battery pack 1, both corrections mentioned below are carried out. That is, the correction of the remaining capacity data of the battery is carried out that when the capacity integrated value Y becomes the maximum capacity integrated value Ym or larger, the maximum capacity integrated value Ym is stored for the external device as the remaining capacity data of the battery. The correction of the reference capacity integrated value Y0 on the basis of the number of times of reaches is carried out. Thus, the remaining capacity data outputted by the microcomputer 5 is determined to be a more precisely corrected reference capacity correction value Yh and has a value nearer to the actual remaining capacity of the battery of the battery pack 1.

In the present invention, the reference capacity integrated value Y0 corrected on the basis of the number of times of reaches is stored in the nonvolatile memory 9.

A method for counting the number of times of reaches in the microcomputer 5 is described below.

Figure 8:
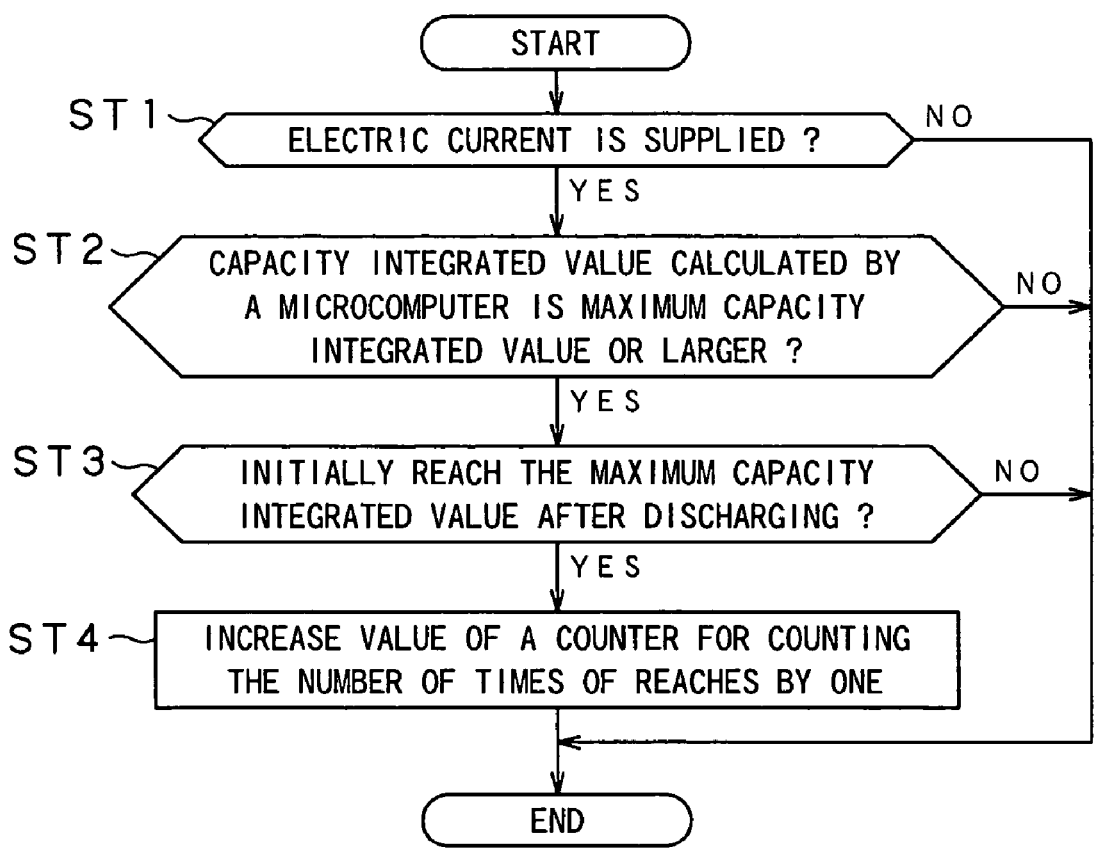
FIG. 8 is a flow chart showing the flow of processes when the microcomputer counts the number of times of reaches.

As shown in FIG. 8, in step ST1, whether or not charging current is supplied to the seventh resistance 27 is firstly detected. When the charging current is supplied to the resistance, the procedure advances to step ST2. When the charging current is not supplied to the resistance, the counting of the number of times of reaches is finished.

Then, in the step ST2, whether or not the capacity integrated value Y is smaller than the maximum integrated value Ym is detected. When the capacity integrated value Y is smaller than the maximum capacity integrated value Ym, the count of the number of times of reaches is finished. When the capacity integrated value Y is not smaller than the maximum capacity integrated value Ym, the procedure advances to step ST3.

Then, in the step ST3, whether or not the capacity integrated value Y initially reaches the maximum capacity integrated value Ym after a discharging operation is detected. When the capacity integrated value Y initially reaches the maximum capacity integrated value Ym after the discharging operation, the procedure advances to step ST4. When the capacity integrated value Y does not initially reach the maximum capacity integrated value Ym after the discharging operation, the count of the number of reaches is finished.

Then, in the step ST4, the number of a counter for counting the number of times of reaches is increased by one.

Further, the microcomputer 5 corrects the reference capacity integrated value Y0 on the basis of the number of times of charging and discharging operations in the battery pack 1.

As causes of the deterioration of the battery pack 1, the number of times that the battery pack 1 is charged and discharged, the using and storage conditions of the battery pack 1 or the like are exemplified. Accordingly, the reference capacity integrated value Y0 is corrected on the basis of the number of times of charging and discharging operations in the battery pack 1 in such a way that every time the number of times of charging and discharging operations in the battery pack 1 increases, for instance, by 50 times, the value of the reference capacity integrated value Y0 is corrected to have 95% as high as a value before the correction. Thus, the remaining capacity of the battery pack 1 can be corrected so as to be nearer to the actual remaining capacity of the battery of the battery pack 1. As a method for counting the number of times that the battery pack 1 is charged and discharged, a method disclosed in, for example, Japanese Patent Application Laid-Open No. hei 9-243718 is exemplified.

In the battery pack 1, a method for correcting the reference capacity integrated value Y0 is described below.

Figure 9:
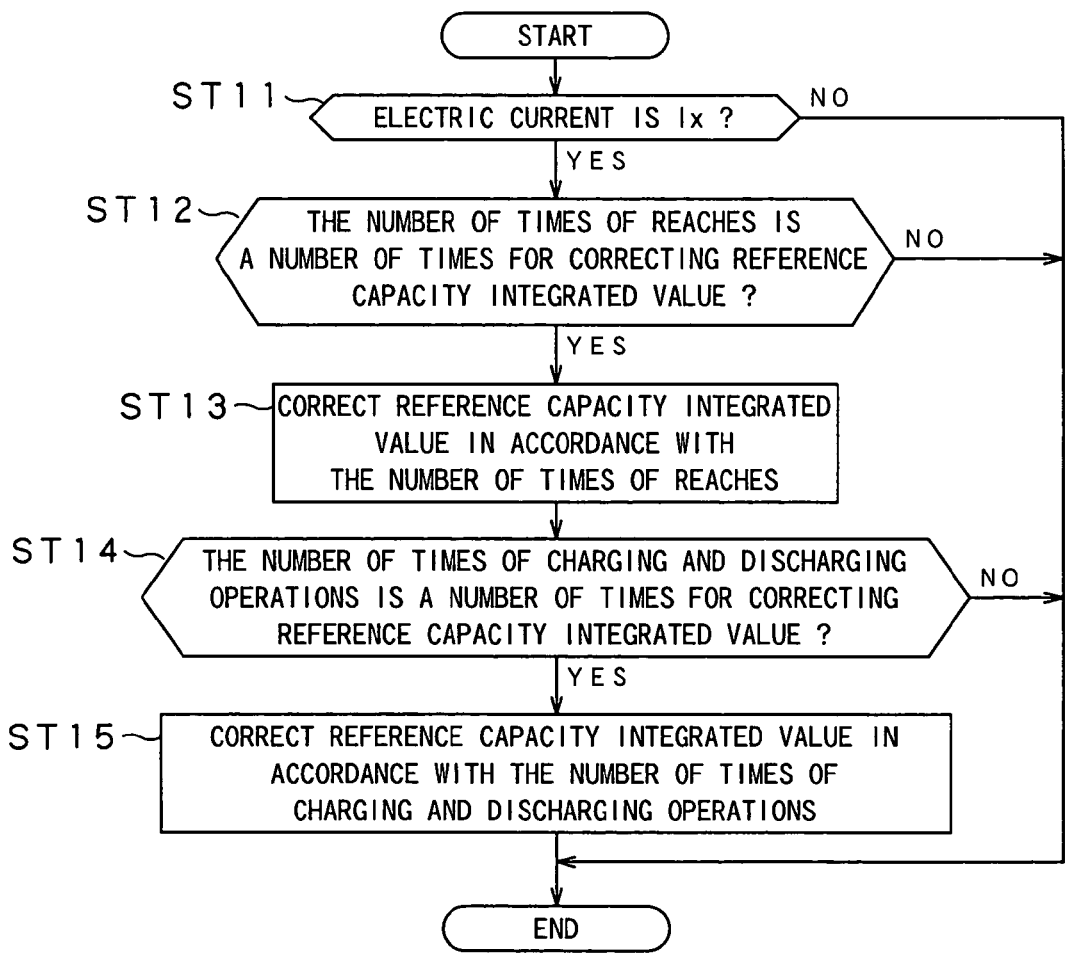
FIG. 9 is a flow chart showing the flow of processes when the microcomputer corrects the reference capacity integrated value.

As shown in FIG. 9, in step ST11, whether or not the value of electric current supplied to the seventh resistance 27 is Ix is firstly decided. When the value of the electric current supplied to the seventh resistance 27 is Ix, the procedure advances to step ST12. When the value of the electric current supplied to the seventh resistance 27 is not Ix, the correction of the reference capacity integrated value Y0 is finished.

Then, in the step ST12, whether or not the number of times of reaches is a number of times for correcting the reference capacity integrated value Y0 is decided. When the number of times of reaches is the number of times for correcting the reference capacity integrated value Y0, the procedure advances to step ST13. When the number of times of reaches is not the number of times for correcting the reference capacity integrated value Y0, the procedure advances to step ST14.

In the step ST13, after the reference capacity integrated value Y0 is corrected on the basis of the number of times of reaches, the procedure advances to the step ST14.

Then, in the step ST14, whether or not the number of times of charging and discharging operations is a number of times for correcting the reference capacity integrated value Y0 is decided. When the number of times of charging and discharging operations is the number of times for correcting the reference capacity integrated value Y0, the procedure is moved to step ST15. When the number of times of charging and discharging operation is not the number of times for correcting the reference capacity integrated value Y0, the correction of the reference capacity integrated value Y0 is finished.

Then, in the step ST15, after the reference capacity integrated value Y0 is corrected on the basis of the number of times of charging and discharging operations, the correction of the reference capacity integrated value Y0 is finished.

Although the above embodiment is described as the structure that only the reference capacity integrated value Y0 is corrected, the maximum capacity integrated value Ym may be corrected in addition thereto. In this case, assuming that the value of the maximum capacity integrated value Ym is, for instance, a value that about 15% as high as the reference capacity integrated value Y0 is added to a value of the reference capacity integrated value Y0, the maximum capacity integrated value Ym may be corrected in accordance with the correction of the reference capacity integrated value Y0.

Figure 10:
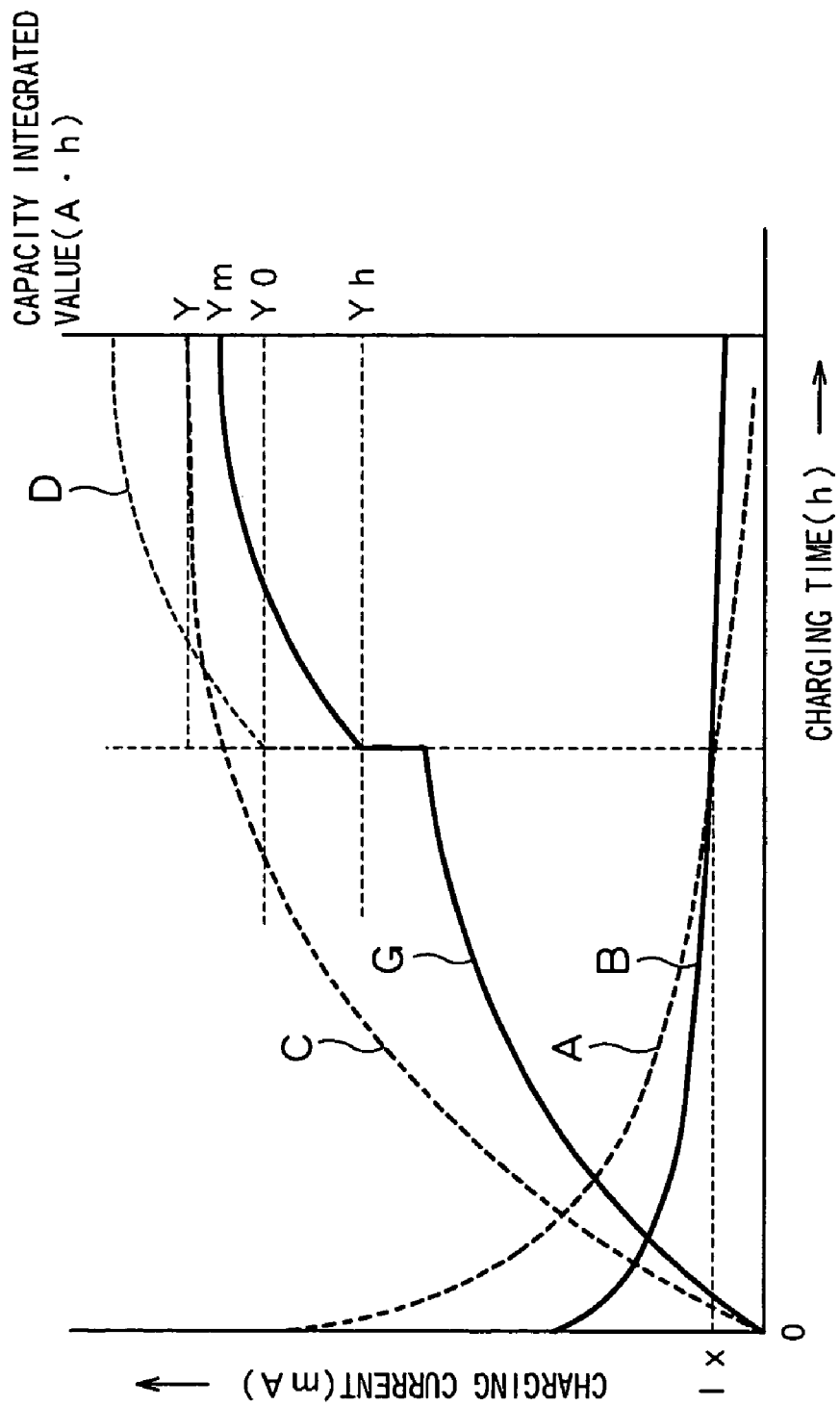
FIG. 10 is a diagram showing the change of the remaining capacity data of the battery when the microcomputer corrects the reference capacity integrated value Y0 on the basis of a number of times of charging and discharging operations in addition to the number of times of reaches.

As described above, in the battery pack 1, the microcomputer 5 corrects the reference capacity integrated value Y0 on the basis of the number of charging and discharging operations as well as the number of times of reaches to obtain the reference capacity integrated value Yh after the correction. Accordingly, in the battery pack 1, the remaining capacity data of the battery calculated by the microcomputer 5 is more precisely corrected as shown in G of FIG. 10 so that the remaining capacity can be drawn nearer to the actual remaining capacity of the battery of the battery pack 1.

Further, in the battery pack 1, the microcomputer 5 corrects the reference capacity integrated value Y0. That is, in the battery pack 1, software is changed so that the remaining capacity data of the battery can be corrected, and the remaining capacity data of the battery can be corrected without increasing a cost.

Figure 11:
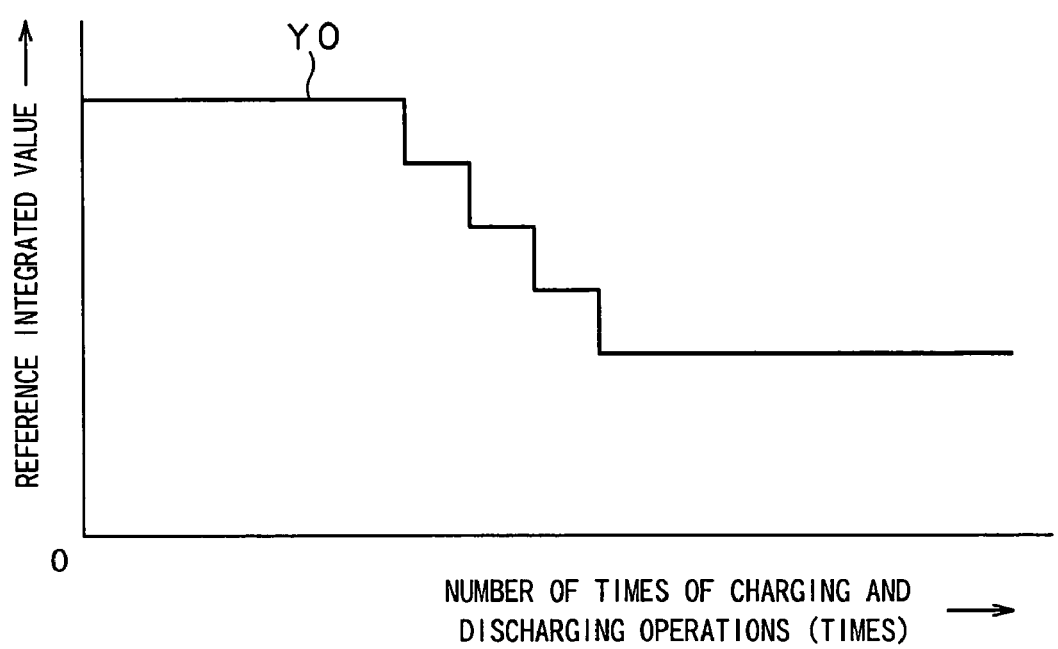
FIG. 11 is a diagram sowing the change of the reference capacity integrated value in accordance with a correction.

As shown in FIG. 11, a lower limit is preferably provided to correct the reference capacity integrated value Y0. The lower limit is provided for correcting the reference capacity integrated value Y0. Thus, the excessive correction of the capacity integrated value Y can be prevented.

As described above, in the battery pack 1, the maximum capacity integrated value Ym is stored in the nonvolatile memory 9. When the calculated capacity integrated value Y is smaller than the maximum capacity integrated value Ym, the microcomputer 5 determines the calculated capacity integrated value Y as the remaining capacity data of the battery. When the calculated capacity integrated value Y is not smaller than the maximum capacity integrated value Ym, the microcomputer 5 determines the maximum capacity integrated value Ym as the remaining capacity data of the battery. Accordingly, in the battery pack 1, the remaining capacity data of the battery outputted by the microcomputer 5 can be prevented from being extremely larger than the capacity of the new battery pack 1.

Further, in the battery pack 1, the microcomputer 5 corrects the reference capacity integrated value Y0 on the basis of the number of times of reaches. Specifically, in the battery pack 1, the remaining capacity data of the battery can be corrected in accordance with the degree of deterioration of the battery pack 1. Therefore, in the battery pack 1, the remaining capacity data of the battery can be corrected in accordance with the deterioration due to not only the number of times of charging and discharging operations, but also the storage conditions or the using conditions. The remaining capacity data of the battery calculated by the microcomputer 5 can be more precisely corrected so that the remaining capacity of the battery can be drawn nearer to the actual remaining capacity of the battery of the battery pack 1.

The present invention is not limited to the above-described embodiments explained by referring to the drawing. It is apparent for a person with ordinary skill in the art that various changes, substitutions or equivalence thereto may be made without departing a scope of attached claims and the gist thereof.

INDUSTRIAL APPLICABILITY

As described above, in the battery pack according to the present invention, the data calculating means determines the capacity integrated value calculated by the capacity integrated value calculating means as the remaining capacity data of the battery when the capacity integrated value calculated by the capacity integrated value calculating means is smaller than the maximum capacity integrated value and determines the maximum capacity integrated value as the remaining capacity data of the battery when the capacity integrated value calculated by the capacity integrated value calculating means is not smaller than the maximum capacity integrated value. Accordingly, in the battery pack according to the present invention, the remaining capacity data of the battery can be prevented from being extremely larger than the capacity of the new battery pack.

In the battery pack according to the present invention, the reference capacity integrated value correcting means corrects the reference capacity integrated value on the basis of the number of times that the capacity integrated value reaches the maximum capacity integrated value. Consequently, in the battery pack according to the present invention, the remaining capacity data of the battery can be corrected in accordance with the degree of deterioration. That is, in the battery pack according to the present invention, the remaining capacity data of the battery can be corrected on the basis of the deterioration due to not only the number of times of charging and discharging operations, but also the storage conditions or the using conditions. Thus, the remaining capacity data of the battery can be drawn to a value near the actual remaining capacity of the battery.

Further, in the method for calculating the remaining capacity of the battery according to the present invention, the capacity integrated value calculated in the capacity integrated value calculating step is determined as the remaining capacity data of the battery when the capacity integrated value calculated in the capacity integrated value calculating step is smaller than the maximum capacity integrated value and the maximum capacity integrated value is determined as the remaining capacity data of the battery when the capacity integrated value calculated in the capacity integrated value calculating step is larger than the maximum capacity integrated value. Consequently, according to the method for calculating the remaining capacity of the battery of the present invention, the outputted remaining capacity data of the battery can be prevented from being extremely larger than the capacity of the new battery pack.

Still further, in the method for calculating the remaining capacity of the battery according to the present invention, the reference capacity integrated value stored in the storing means is corrected on the basis of the number of times counted in the reaching time counting step in the first reference capacity integrated value correcting step. Accordingly, in the method for calculating the remaining capacity of the battery pack according to the present invention, the remaining capacity data of the battery can be corrected on the basis of the deterioration due to not only the number of times of charging and discharging operations, but also the storage conditions or the using conditions. Thus, the remaining capacity data of the battery can be drawn to a value near the actual remaining capacity of the battery.

What is claimed is:

1. A battery pack mounted on an external device, the battery pack comprising:
    a battery cell that is charged and discharged;
    a current detecting means for detecting electric current flowing when the battery cell is charged and discharged;
    a capacity integrated value calculating means for calculating a capacity integrated value by integrating the electric current;
    a reset means for resetting the capacity integrated value to a reference capacity integrated value when the current detected by the current detecting means reaches a prescribed value;
    a storing means for storing a maximum capacity integrated value and the reference capacity integrated value; and
    a data calculating means for calculating a remaining capacity data of a battery on the basis of the capacity integrated value, wherein the capacity integrated value calculating means integrates the current by regarding the reference capacity integrated value as a reference, and the data calculating means determines the capacity integrated value calculated by the capacity integrated value calculating means as the remaining capacity data of the battery when the capacity integrated value calculated by the capacity integrated value calculating means is smaller than the maximum capacity integrated value and determines the maximum capacity integrated value as the remaining capacity data of the battery when the capacity integrated value calculated by the capacity integrated value calculating means is not smaller than the maximum capacity integrated value.

2. The battery pack according to claim 1, further comprising:
    a reaching time counting means for counting a number of times that the capacity integrated value calculated by the capacity integrated value calculating means reaches the maximum capacity integrated value; and
    a reference capacity integrated value correcting means for correcting the reference capacity integrated value on the basis of the number of times counted by the reaching time counting means.

3. The battery pack according to claim 2, wherein the reference capacity integrated value corrected by the reference capacity integrated value correcting means is a prescribed value or larger.

4. The battery pack according to claim 1, further including a data output means for outputting the remaining capacity data of the battery to the external device.

5. The battery pack according to claim 1, further including a charging and discharging time counting means for counting the number of times that the battery cell is charged and discharged, wherein the reference capacity integrated value correcting means corrects the reference capacity integrated value on the basis of the number of times counted by the charging and discharging time counting means.

6. A battery pack mounted on an external device, the battery pack comprising:
    a battery cell that is charged and discharged;
    a current detecting means for detecting electric current flowing when the battery cell is charged and discharged;
    a capacity integrated value calculating means for calculating a capacity integrated value by integrating the electric current;
    a reset means for resetting the capacity integrated value to a reference capacity integrated value when the current detected by the current detecting means reaches a prescribed value;
    a storing means for storing a maximum capacity integrated value and the reference capacity integrated value;
    a reaching time counting means for counting a number of times that the capacity integrated value reaches the maximum capacity integrated value; and
    a reference capacity integrated value correcting means for correcting the reference capacity integrated value on the basis of the number of times counted by the reaching time counting means, wherein the capacity integrated value calculating means integrates the current on the basis of the reference capacity integrated value to calculate the capacity integrated value and determines the capacity integrated value as the remaining capacity data of a battery.

7. The battery pack according to claim 6, wherein the reference capacity integrated value corrected by the reference capacity integrated value correcting means is a prescribed value or larger.

8. The battery pack according to claim 6, further including a data output means for outputting the remaining capacity data of the battery to the external device.

9. The battery pack according to claim 6, further including a charging and discharging time counting means for counting a number of times that the battery cell is charged and discharged, wherein the reference capacity integrated value correcting means corrects the reference capacity integrated value on the basis of the number of times counted by the charging and discharging time counting means.

10. A method for calculating the remaining capacity of a battery of a battery pack mounted on an external device, the method comprising:
   a current detecting step of detecting electric current flowing when a battery cell provided in the battery pack is charged and discharged;
   a capacity integrated value calculating step of calculating a capacity integrated value by integrating the electric current;
   a resetting step of resetting the capacity integrated value to a reference capacity integrated value when the current reaches a prescribed value; and
   a data calculating step of calculating the remaining capacity data of a battery on the basis of the capacity integrated value, wherein in the capacity integrated value calculating step, the current is integrated on the basis of the reference capacity integrated value, and in the data calculating step, the capacity integrated value calculated in the capacity integrated value calculating step is compared with a maximum capacity integrated value stored in a storing means and the capacity integrated value calculated in the capacity integrated value calculating step is determined as the remaining capacity data of the battery when the capacity integrated value calculated in the capacity integrated value calculating step is smaller than the maximum capacity integrated value and the maximum capacity integrated value is determined as the remaining capacity data of the battery when the capacity integrated value calculated in the capacity integrated value calculating step is larger than the maximum capacity integrated value.

11. The method for calculating the remaining capacity of a battery according to claim 10, further comprising:
   a reaching time counting step of counting a number of times that the capacity integrated value calculated in the capacity integrated value calculating step reaches the maximum capacity integrated value; and
   a first reference capacity integrated value correcting step of correcting the reference capacity integrated value on the basis of the number of times counted in the reaching time counting step.

12. The method for calculating the remaining capacity of a battery according to claim 11, wherein the reference capacity integrated value corrected in the first reference capacity integrated value correcting step is a prescribed value or larger.

13. The method for calculating the remaining capacity of a battery according to claim 10, further including a data output step of outputting the remaining capacity data of the battery to the external device.

14. The method for calculating the remaining capacity of a battery according to claim 10, further comprising:
   a charging and discharging time counting step of counting a number of times that the battery cell is charged and discharged, and
   a second reference capacity integrated value correcting step of correcting the reference capacity integrated value on the basis of the number of times counted by the charging and discharging time counting step.

15. The method for calculating the remaining capacity of a battery according to claim 14, wherein the reference capacity integrated value corrected in the second reference capacity integrated value correcting step is a prescribed value or larger.

16. A method for calculating a remaining capacity of a battery of a battery pack mounted on an external device, the method comprising:
   a current detecting step of detecting electric current flowing when a battery cell provided in the battery pack is charged and discharged;
   a capacity integrated value calculating step of calculating a capacity integrated value by integrating the electric current;
   a resetting step of resetting the capacity integrated value to obtain a reference capacity integrated value when the current reaches a prescribed value;
   a reaching time counting step of counting the number of times that the capacity integrated value calculated in the capacity integrated value calculating step reaches a maximum capacity integrated value stored in a storing means; and
   a first reference capacity integrated value correcting step of correcting the reference capacity integrated value stored in the storing means on the basis of the number of times counted in the reaching time counting step, wherein in the capacity integrated value calculating step, the current is integrated on the basis of the reference capacity integrated value to calculate the capacity integrated value and the capacity integrated value is determined as the remaining capacity data of the battery.

17. The method for calculating the remaining capacity of a battery according to claim 16, wherein the reference capacity integrated value corrected in the first reference capacity integrated value correcting step is a prescribed value or larger.

18. The method for calculating the remaining capacity of a battery according to claim 16, further including a data output step of outputting the remaining capacity data of the battery to the external device.

19. The method for calculating the remaining capacity of a battery according to claim 16, further comprising:
   a charging and discharging time counting step of counting the number of times that the battery cell is charged and discharged, and
   a second reference capacity integrated value correcting step of correcting the reference capacity integrated value stored in the storing means on the basis of the number of times counted in the charging and discharging time counting step.

20. The method for calculating the remaining capacity of a battery according to claim 19, wherein the reference capacity integrated value corrected in the second reference capacity integrated value correcting step is a prescribed value or larger.

* * * * *